(12) United States Patent
Ryynanen

(10) Patent No.: US 7,265,748 B2
(45) Date of Patent: Sep. 4, 2007

(54) METHOD AND DEVICE FOR DETECTING TOUCH PAD INPUT

(75) Inventor: Matti Ryynanen, Helsinki (FI)

(73) Assignee: Nokia Corporation, Espoo (FI)

( * ) Notice: Subject to any disclaimer, the term of this patent is extended or adjusted under 35 U.S.C. 154(b) by 455 days.

(21) Appl. No.: 10/733,872

(22) Filed: Dec. 11, 2003

(65) Prior Publication Data

US 2005/0128190 A1    Jun. 16, 2005

(51) Int. Cl.
*G09G 5/00* (2006.01)
(52) U.S. Cl. ..................................... 345/175
(58) Field of Classification Search ........ 345/173–179, 345/102
See application file for complete search history.

(56) References Cited

U.S. PATENT DOCUMENTS

| | | | |
|---|---|---|---|
| 6,351,260 B1 * | 2/2002 | Graham et al. | 345/179 |
| 6,538,644 B1 * | 3/2003 | Muraoka | 345/175 |
| 6,677,934 B1 * | 1/2004 | Blanchard | 345/175 |
| 6,972,753 B1 * | 12/2005 | Kimura et al. | 345/175 |
| 7,042,444 B2 * | 5/2006 | Cok | 345/173 |
| 7,099,553 B1 * | 8/2006 | Graham et al. | 385/146 |
| 2004/0201579 A1 * | 10/2004 | Graham | 345/175 |
| 2005/0093813 A1 * | 5/2005 | Yamamoto et al. | 345/102 |

FOREIGN PATENT DOCUMENTS

WO    WO 01/95027    12/2001

* cited by examiner

*Primary Examiner*—Amr A. Awad
*Assistant Examiner*—Stephen G Sherman
(74) *Attorney, Agent, or Firm*—Ware, Fressola, Van Der Sluys & Adolphson LLP

(57) ABSTRACT

A method and system for determining the location of an object touching a touch pad. A light source is used to provide a light beam and a plurality of reflecting surfaces are disposed along an edge of the touch pad to partially reflect the light beam in order to provide a light sheet over the touch pad, such that the reflected intensity varies monotonously along the edge. A detector structure is disposed on the opposite edge to measure the light intensity of the light sheet, part of which is blocked when the object touches the touch pad. The reduction in the measured light intensity is used to calculate the location of the touching object in one direction. A second light sheet and a corresponding detector structure can be used to determine the location of the touching object in a different direction.

21 Claims, 8 Drawing Sheets

METHOD AND DEVICE FOR DETECTING TOUCH PAD INPUT

FIELD OF THE INVENTION

The present invention relates generally to a touch sensitive device in an electronic device or a wireless telecommunication terminal.

BACKGROUND OF THE INVENTION

A touch pad is usually defined as a touch-sensitive user interface area in an electronic device, which allows a user to input information or a command to the device by pressing the touch sensitive area. The touch pad can be used as a keypad having a designated functionality. For example, a touch pad can be used as an on/off switch and the user can turn the electronic device on or off by pressing the touch sensitive area. The touch pad can have several selectable functions. For example, the touch pad can be used as a keyboard having a plurality of soft-keys of different functions to allow the user to enter or select one function at a time.

In some touch pads, it is required to press the pad surface in order to deform it. In such a touch pad, several layers of material, separated by thin spacers, are used to form a grid of vertical and horizontal rows of electrodes. An electrical current is maintained in the grid of electrodes. When a user presses the pad, the layers are caused to make contact with each other at the pressing point, thereby interrupting the current in the electrode grid. A detection circuit is used to detect the interruption in the current and determine the location of the pressing point on the pad. In other touch pads, mere touching of the pad surface by a finger is sufficient. This latter type of touch pad can be of a resistive-type or capacitive-type. On a resistive-type touch pad, a thin, electrically conductive and resistive layer is coated on the surface of the touch pad area. On a capacitive-type touch pad, a coated layer forming a matrix of pixel-like capacitors is provided on the touch sensitive area. When a finger touches the surface, it changes the electrical characteristics of the coated layer. By measuring the resistance or capacitance values at a number of surface points corresponding to the pressing point, the location of the pressing point can be determined. On an inductive-type touch pad, inductive elements are distributed over the touch pad area. A stylus made of an inductive material is used to change the signals transmitted through the inductive elements for the detection of the presence of the stylus. In some touch pads, if the user moves the touching object around the touch sensitive area and a series of pressing points are registered, the movement of the touching object can also be calculated.

When the touch pad is also used as an information display or an image display, the electrodes positioned on top of a touch pad may affect the optical transparency of display and/or distort the displayed text or image. Furthermore, some touch pads can be damaged by having dirt or scratches on the touch pad surface. In recent years, surface wave technology is also used in touch pad applications. In particular, ultrasonic waves propagating on the touch pad surface are used to detect the interruption or absorption of the waves due to touching. While a touch pad using this surface wave technology does not affect the optical quality of the display, it is costly to produce.

It is advantageous and desirable to provide a touch pad, which is cost effective and does not affect its optical quality.

SUMMARY OF THE INVENTION

The present invention uses one or more light sheets and one or more light detector structures to measure the intensity of the light sheets. The intensity of which is spatially varying so that when the light sheets are partially blocked by an object, the location of the touching object can be determined.

Thus, according to the first aspect of the present invention, there is provided a method for determining a location of an object substantially touching a touch pad, the touch pad having a plurality of surrounding edges. The method comprises:

providing a light sheet over the touch pad such that the light sheet is partially blocked by the object when the object substantially touches the touch pad, wherein the light intensity of the light sheet is spatially varying in such a manner that the blocked intensity is dependent upon the location of the touching object;

disposing a light detecting structure adjacent to at least one of the surrounding edges of the touch pad for measuring the light intensity of the light sheet, wherein the measured light intensity is reduced by the blocked intensity when the light sheet is partially blocked by the touching object; and calculating the location of the touching object based on the measured reduced intensity.

The light detecting structure is disposed adjacent to a first surrounding edge, and the light sheet is provided by a light providing structure disposed adjacent to a second surrounding edge opposite to the first surrounding edge, and wherein the light providing structure has a longitudinal axis and a plurality of light providing sections disposed along the longitudinal axis to provide a plurality of light portions of the light sheet such that the intensity of the light portions varies along the longitudinal axis.

The light providing structure comprises:

a light source for providing a light beam along the longitudinal axis; and a plurality of partially reflecting surfaces disposed in said light providing sections to partially reflect the light beam toward the light detecting structure for providing said plurality of light portions of the light sheet.

The light providing structure comprises a plurality of substantially parallel plates having a plurality of interfaces between adjacent parallel plates to provide said partially reflecting surfaces.

The light source comprises a laser or any collimated light beam.

The surrounding edges further comprise a third surrounding edge and an opposing fourth surrounding edge, said method further comprising:

providing a further light providing structure adjacent to the third surrounding edge for providing a further light sheet over the touch pad such that the further light sheet is partially blocked by the object when the object substantially touches the touch pad, wherein the light intensity of the further light sheet is spatially varying in such a manner that the blocked intensity is dependent upon the location of the touching object;

disposing a further light detecting structure adjacent to the fourth surrounding edge to measure the light intensity of the further light sheet, wherein the measured light intensity of the further light sheet is reduced by the blocked intensity when the further light sheet is partially blocked by the touching object; and calculating the location of the touching object also based on the measured reduced light intensity of the further light sheet.

According to the second aspect of the present invention, there is provided a light detecting system for use in conjunction with a touch pad for determining a location of an object substantially touching the touch pad, the touch pad having a plurality of surrounding edges. The system comprises:

a light sheet disposed over the touch pad such that the light sheet is partially blocked by the object when the object substantially touches the touch pad, wherein the light intensity of the light sheet is spatially varying in such a manner that the blocked intensity is dependent upon the location of the touching object;

a light detecting structure disposed adjacent to at least one of the surrounding edges of the touch pad for measuring the light intensity of the light sheet for providing a signal indicative of the measured light intensity, wherein the measured light intensity is reduced by the blocked intensity when the light sheet is partially blocked by the touching object; and a computation module, responsive to he signal, for calculating the location of the touching object based on the measured reduced intensity.

The light detecting structure is disposed adjacent to a first surrounding edge, and the light sheet is provided by a light providing structure disposed adjacent to a second surrounding edge opposite to the first surrounding edge, and wherein the light providing structure has a longitudinal axis and a plurality of light providing sections along the longitudinal axis to provide a plurality of light portions of the light sheet such that the intensity of the light portions varies along the longitudinal axis.

The light providing structure comprises a light source for providing a light beam along the longitudinal axis; and a plurality of partially reflecting surfaces disposed in said light providing sections to partially reflect the light beam toward the light detecting structure for providing said plurality of light portions of the light sheet.

The light providing structure comprises a plurality of substantially parallel plates having a plurality of interfaces between adjacent parallel plates to provide said partially reflecting surfaces.

The light emits light in the visible wavelength region, in the infrared wavelength region or other useful region.

According to the present invention, the surrounding edge further comprises a third surrounding edge and an opposing fourth surrounding edge. The system further comprises:

a further light providing structure disposed adjacent to the third surrounding edge for providing a further light sheet over the touch pad such that the further light sheet is partially blocked by the object when the object substantially touches the touch pad, wherein the light intensity of the further light sheet is spatially varying in such a manner that the blocked intensity is dependent upon the location of the touching object; and a further light detecting structure disposed adjacent to the fourth surrounding edge to measure the light intensity of the further light sheet for providing to the computation module a further signal indicative of the measured light intensity of the further light sheet, wherein the measured light intensity of the further light sheet is reduced when the light sheet is partially blocked by the touching object, so as to allow the computation module to calculate the location of the touching object also based on the measured reduced light intensity of the further light sheet in response to the further signal.

According to the present invention, the light detecting structure comprises:

a light detector for providing the signal; and a light pipe for receiving at least a part of the light sheet and conveying at least a part of the received light to the light detector.

The light pipe has a first end, an opposing second end, a longitudinal axis connecting the first end and the second end, and a pipe surface along the longitudinal axis, wherein the light detector is disposed at the first end, and wherein the pipe surface has diffractive or prismatic surfaces to convey said at least a part of the received light to the first end.

The light detecting structure further comprises:

a reflecting surface disposed at the second end of the light pipe for directing at least a further part of the received light toward the light detector.

The reflecting surface can be provided by a mirror disposed adjacent to the second end of the light pipe, or a coating on the second end.

According to the present invention, the light detecting structure comprises:

a further light detector disposed at the second end of the light pipe, wherein the diffractive or prismatic surfaces also convey a further part of the received light to the further light detector for providing a further signal so as to allow the computation module to calculate the location of the touching object also based on the further signal.

The interfaces can be provided at the air gaps between two adjacent parallel plates, or the transparent bonding material between two adjacent parallel plates.

The parallel plates can be made of materials of different refractive indices to provide the partial reflecting interfaces.

Alternatively, a partial reflective coating on the plate can be provided at each of the interfaces.

The present invention will become apparent upon reading the description taken in conjunction with FIGS. 1 to 8.

DETAILED DESCRIPTION OF THE INVENTION

Figure 1:
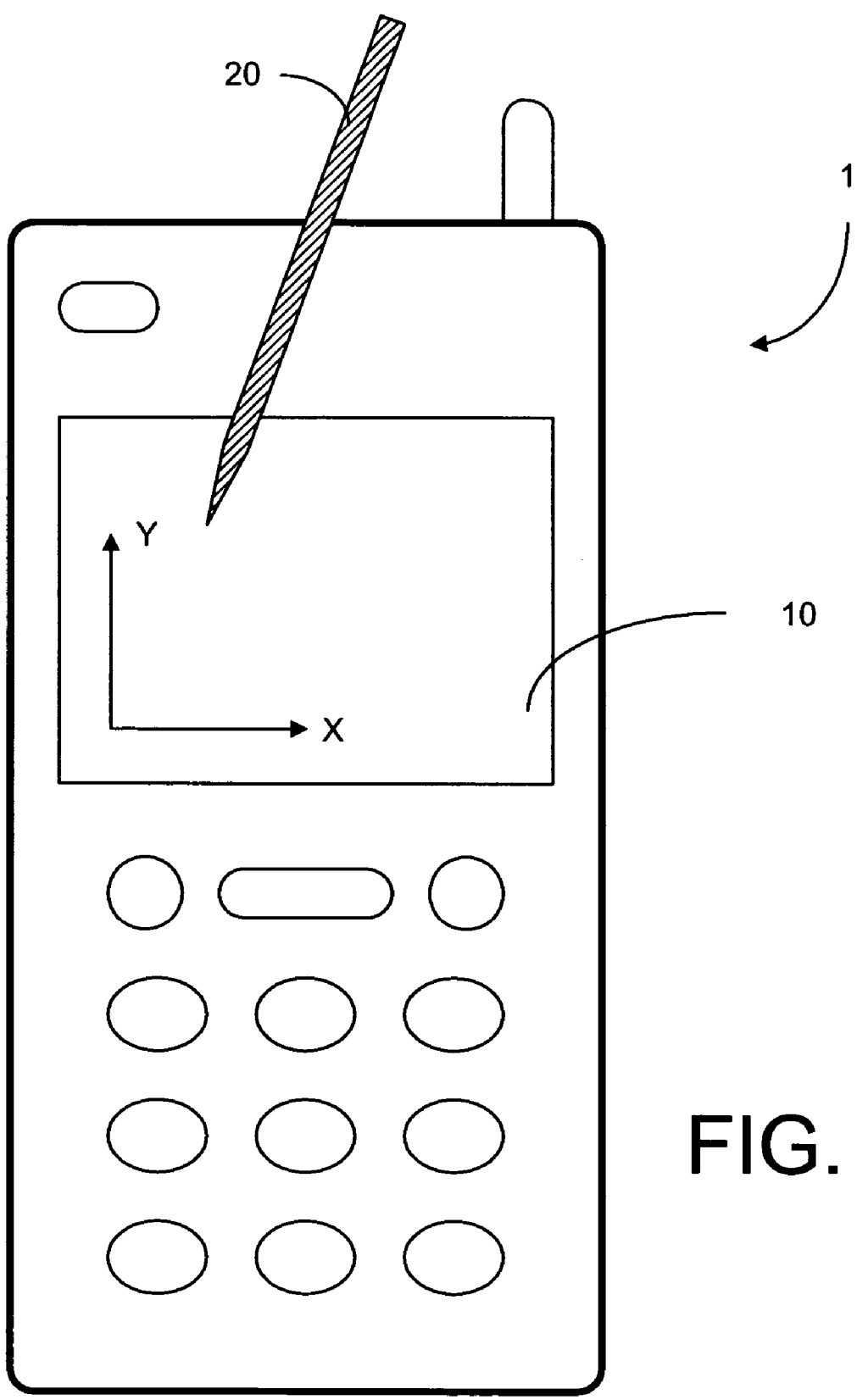
FIG. 1 is a schematic representation showing a portable electronic device having a touch screen, according to the present invention.

FIG. 1 is a schematic representation of a portable electronic device. The portable electronic device 1, as shown in the figure, can be a mobile terminal, a communicator device, a personal digital assistance (PDA), or the like. The electronic device 1 has a touch screen 10 to allow a user to use an object such as a stylus 20, a finger or any suitable object to input information in the electronic device 1. For example, if the touch screen 10 has one or more soft buttons to allow the user to execute a function, the user can use the object 20 to select a desired soft button on the touch screen 10. The user can also use the object to write alphabet characters, to make a drawing and so forth. The touch screen 10 has means to detect the position and/or movement of the touching object 20 in both X and Y directions.

Figure 2:
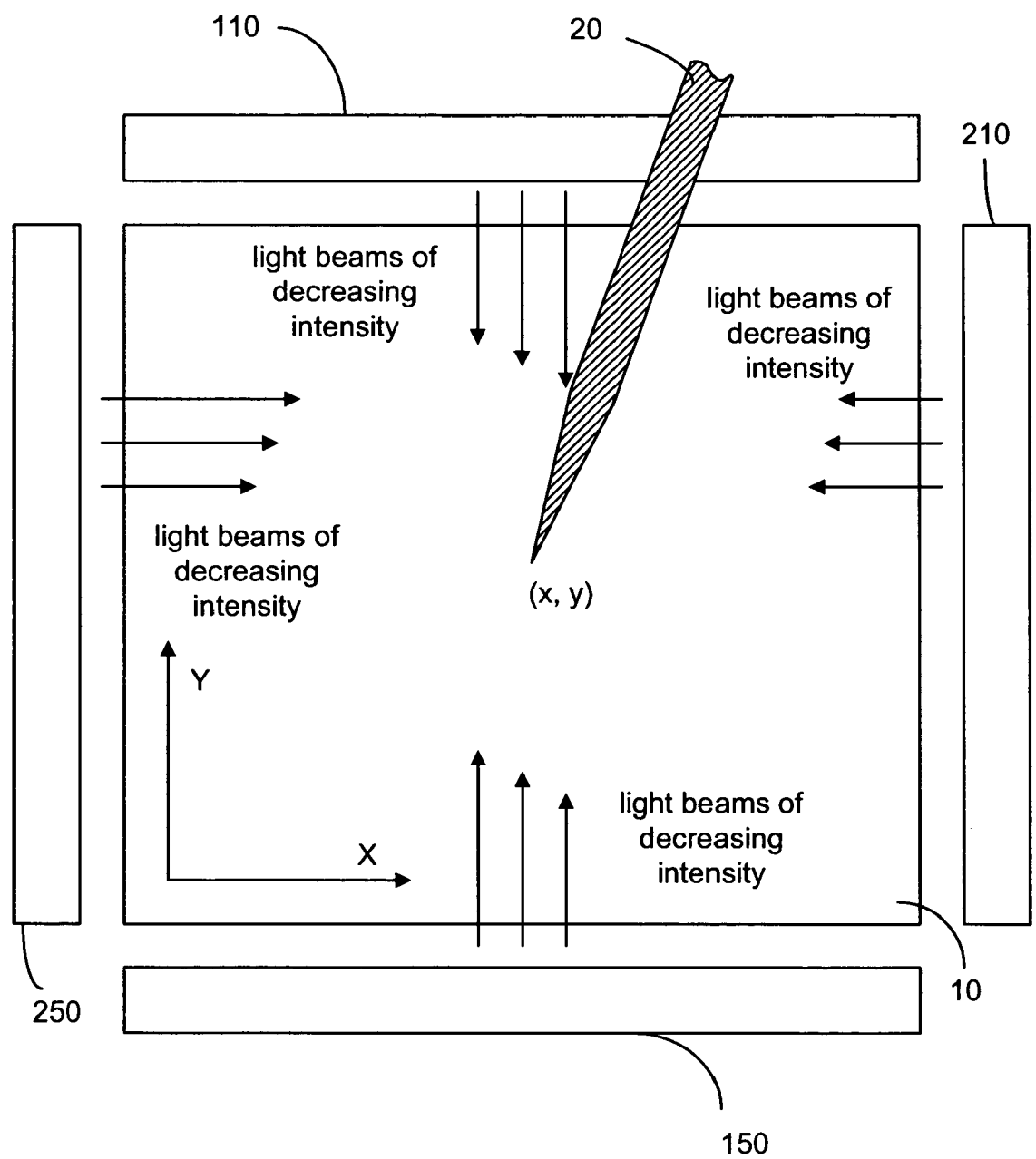
FIG. 2 is a schematic representation showing a touch pad device having a plurality of optical emitter/detector systems placed around the touch pad area.

As shown in FIG. 2, the touch screen 10 has two optical emitter/detector systems 110 and 150 to detect the position and/or motion of the touching object 20 in the X direction, and two optical emitter/detector systems 210 and 250 to detect the position and/or motion of the touching object 20 in the Y direction.

Figure 3:
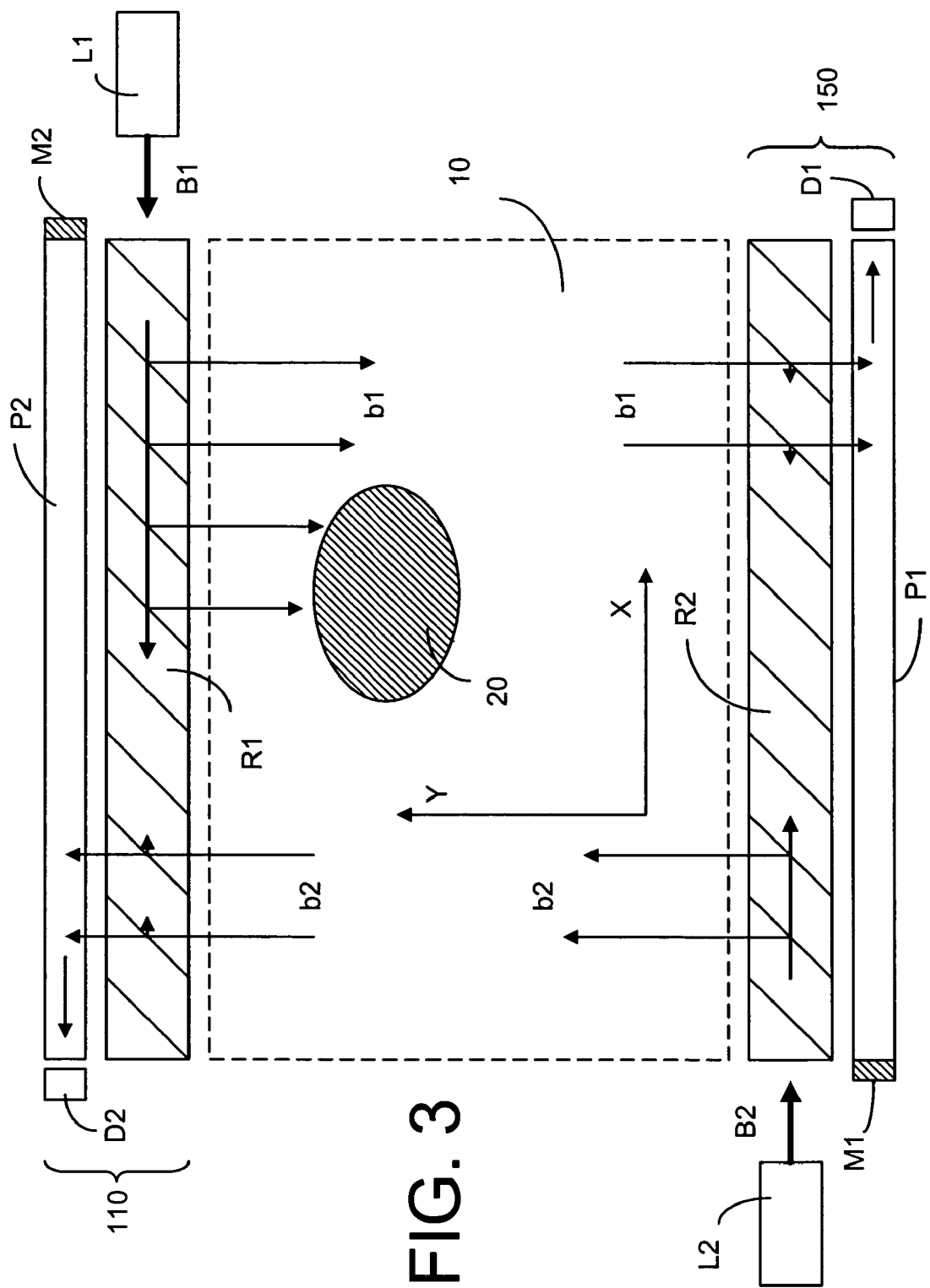
FIG. 3 is a schematic representation showing two similar optical emitter/detector systems to detect a touching object in one direction.
Figure 4:
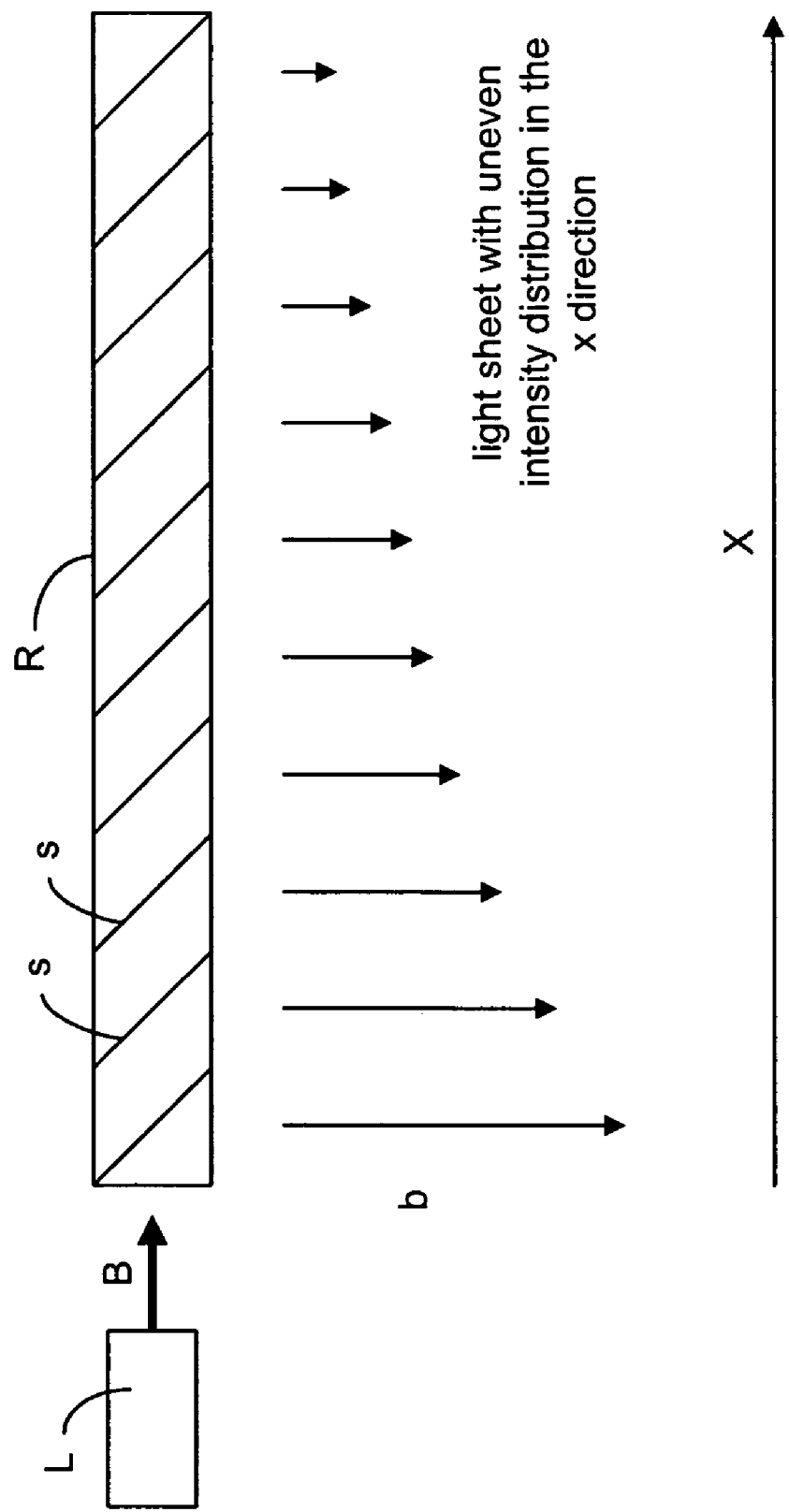
FIG. 4 is a schematic representation showing a source reflector for providing a light sheet with decreasing intensity distribution in one direction.

According to one embodiment of the present invention, the optical emitter/detector system 110 is similar to the optical emitter/detector system 150. As shown in FIG. 3, the optical emitter/detector system 110 comprises a light source L1 to provide a collimated beam, and a reflection bar R1 to provide a group of substantially parallel light beams b1 substantially in the Y direction. As shown in FIG. 4, the reflection device has a plurality of partial reflection surfaces (s) to form a light sheet made of a plurality of reflected beams (b). The intensity of the light beams (b) decreases with x. If the reflection amount per unit length is constant, then the intensity of the reflected beams has the form of $f(x)=I_0 e^{-\alpha x}$. Likewise, the optical emitter/detector system 150 comprises a light source L2 for providing a collimated beam, and a reflection bar R2 to provide a group of substantially parallel light beams b2 substantially in the Y direction. If the beams b1 are not obstructed by the touching object 20, they will encounter the reflection bar R2. After some partial reflection in the reflection bar R2, the beams b1 will be trapped in a light trapping device P1, reflected by a mirror M1 and detected by a detector D1. Likewise, if the beams b2 are not obstructed by the touching object 20, they will encounter the reflection bar R1. After some partial reflection in the reflection bar R1, the beams b2 will be trapped in a light trapping device P2, reflected by a mirror M2 and detected by a detector D2. But when a touching object 20 is used to touch the screen 10, some of the beams b1 and b2 are blocked by the object 20, creating a shadow on the light trapping device P1 and P2. Accordingly, the detected intensity in the detectors D1 and D2 is reduced. Because of the uneven light distribution along the X direction, it is possible to calculate the x coordinate of the touching object 20 from the reduction in the detected intensity in D1 and D2.

In order to detect the y coordinate of the touching object 20, it is possible to use two similar optical emitter/detector systems 210 and 250, as shown in FIG. 2.

Figure 5:
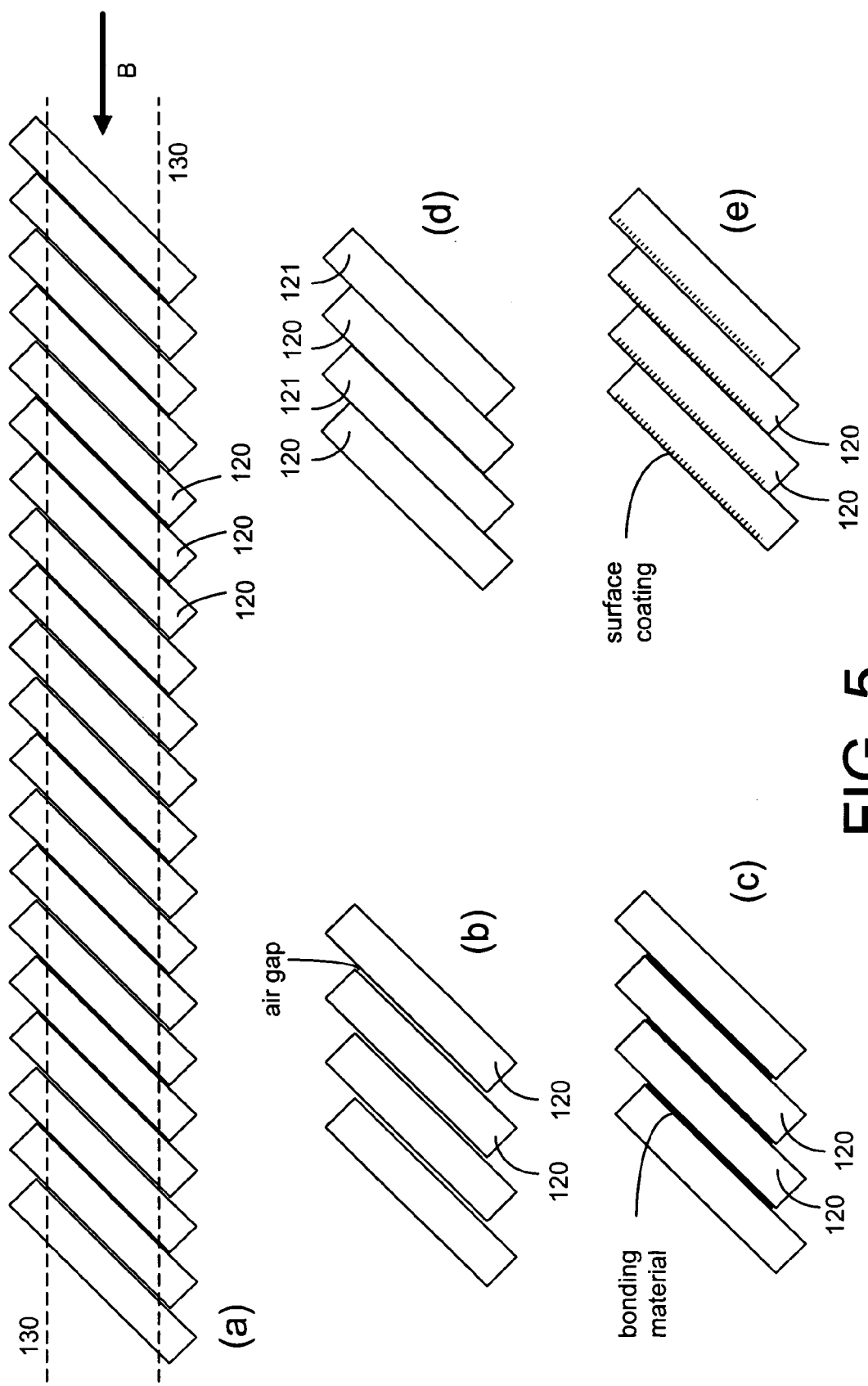
FIG. 5*a* is a schematic representation illustrating a stack of optical plates being used to make a reflection bar.
FIG. 5*b* is a schematic representation illustrating an air gap between two adjacent plates being used to create a partial reflection interface.
FIG. 5*c* is a schematic representation illustrating a transparent bonding material between two adjacent plates being used to create a partial reflection interface.
FIG. 5*d* is a schematic representation illustrating plates of different refractive indices being used to create a partial reflection interface.
FIG. 5*e* is a schematic representation illustrating a surface coating used to create a partial reflection interface between two plates.

The reflection bar R, R1 and R2 as shown in FIGS. 3 and 4 can be made of a stack of parallel plates 120 of optical material, such that the interface between two adjacent plates causes partial reflection of the incoming light beam B. The stack is then cut along the lines 130, as shown in FIG. 5a. It is possible to create a partial reflection interface by leaving a very small air gap between two adjacent plates, as shown in FIG. 5b, so long as the refractive index difference does not cause a total internal reflection. It is also possible to hold the plates together with a transparent bonding material, as shown in FIG. 5c, wherein the refractive index of the bonding material is different from the refractive index of the plates. It is also possible to create a partial reflection interface by using an alternate stack of plates made of optical materials of different refractive indices, as shown in FIG. 5d. For example, the stack can be made of glass plates and plastic plates. The stack can also be made of two types of plastic. Furthermore, one or both surfaces of the plates can be coated with a dielectric or metal layer, as shown in FIG. 5e.

The light source (L, L1, L2) can be a laser or a point-like light source collimated by one or more lenses so that the reflected light beams (b, b1, b2) form a reasonably thin light sheet. Preferably, the reflected light beams are substantially parallel to each other. However, a slight diversion in the beam size is tolerable. It is essential that the intensity of the reflected light beams monotonously decreases so that the position of the touching object can be calculated from the reduction in the detected intensity. Light emitted by the light source (L, L1, L2) can be in the visible wavelength range, infrared wavelength range or other spectral regions.

Figure 6A:
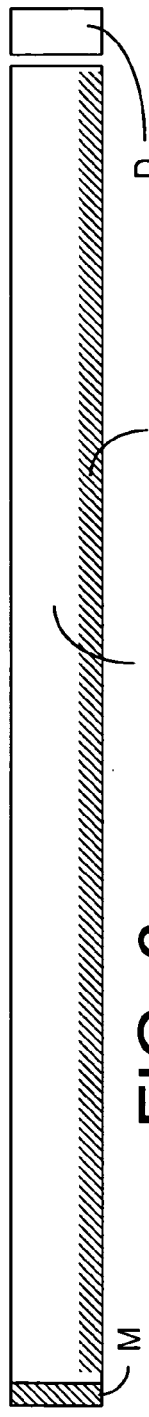
FIG. 6a is a schematic representation illustrating a light trapping pipe structure, along with an optical detector disposed at one end of the structure.
Figure 6B:
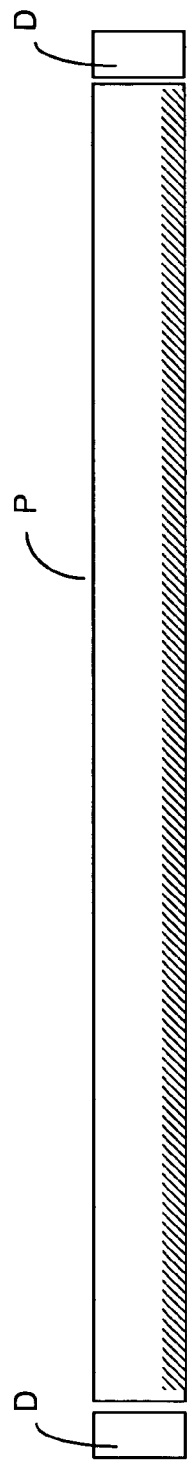
FIG. 6b is a schematic representation illustrating a light trapping pipe structure, along with two optical detectors separately disposed at both ends of the structure.
Figure 6C:
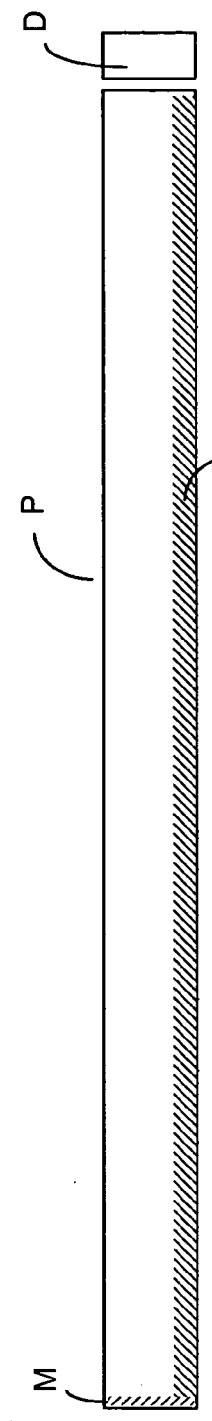
Figure 6D:
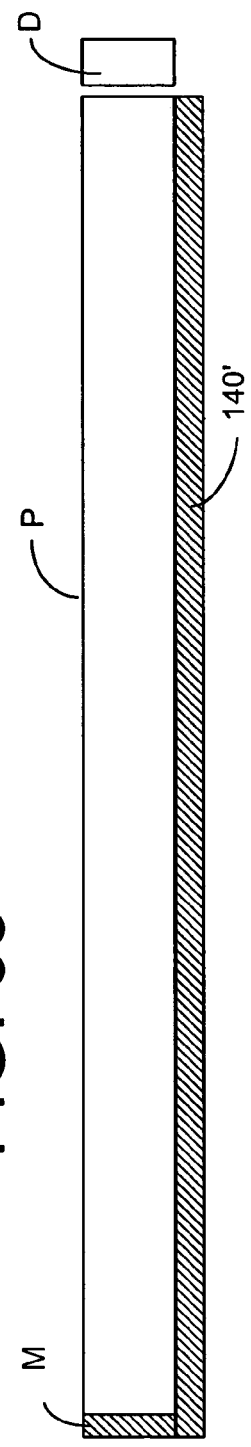

The light trapping device, P, as shown in FIG. 3 can be made of a light pipe having a diffractive or prismatic surface 140 for trapping light in the pipe so that a sufficient amount of light encountering the light trapping device is detected by the detector D. As shown in FIG. 6a, a mirror M is placed at one end of the pipe structure P to reflect the trapped light toward the detector D. However, it is also possible to dispose two detectors D, each at one end of the pipe structure P to measure the intensity of the trapped light. Furthermore, it is possible to provide a reflective coating or a diffractive structure M on the end of the pipe structure P to reflect the trapped light toward the detector D, as shown in FIG. 6c. It is also possible to provide a separate diffractive or prismatic structure 140' adjacent to the pipe structure P for trapping light in the pipe, as shown in FIG. 6d.

Figure 7:
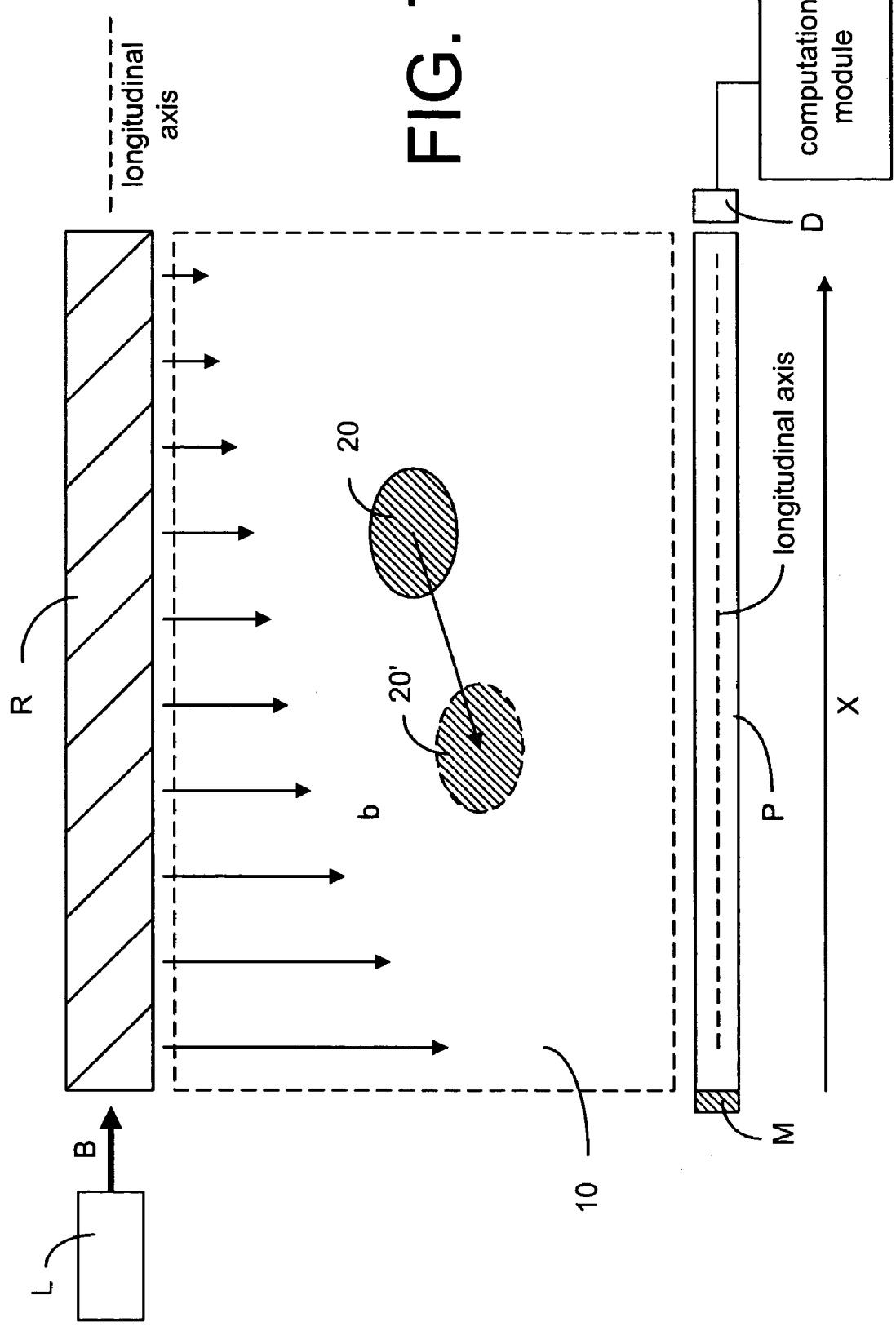
FIG. 7 is a schematic representation showing an alternative embodiment of the present invention.

It should be noted that, if the size of the touching object 20 is not known, it is necessary to use two optical emitter/detector systems (110, 150) or (210, 250) to calculate the position of the touching object 20. However, when one wants only to detect the motion, and not the location, of the touching object 20, it is possible to use one reflection bar R and one detector, as shown in FIG. 7. Also shown in FIG. 7 is a computation module operatively connected to the detector D for determining the location of the touching object 20 based on a signal provided by the detector D. As shown in FIG. 7, the pipe structure P is a light pipe with a longitudinal axis, which is substantially parallel to an edge of the touch screen 10. Likewise, the reflection bar R has a longitudinal axis which is also substantially parallel to the opposite edge.

Figure 8:
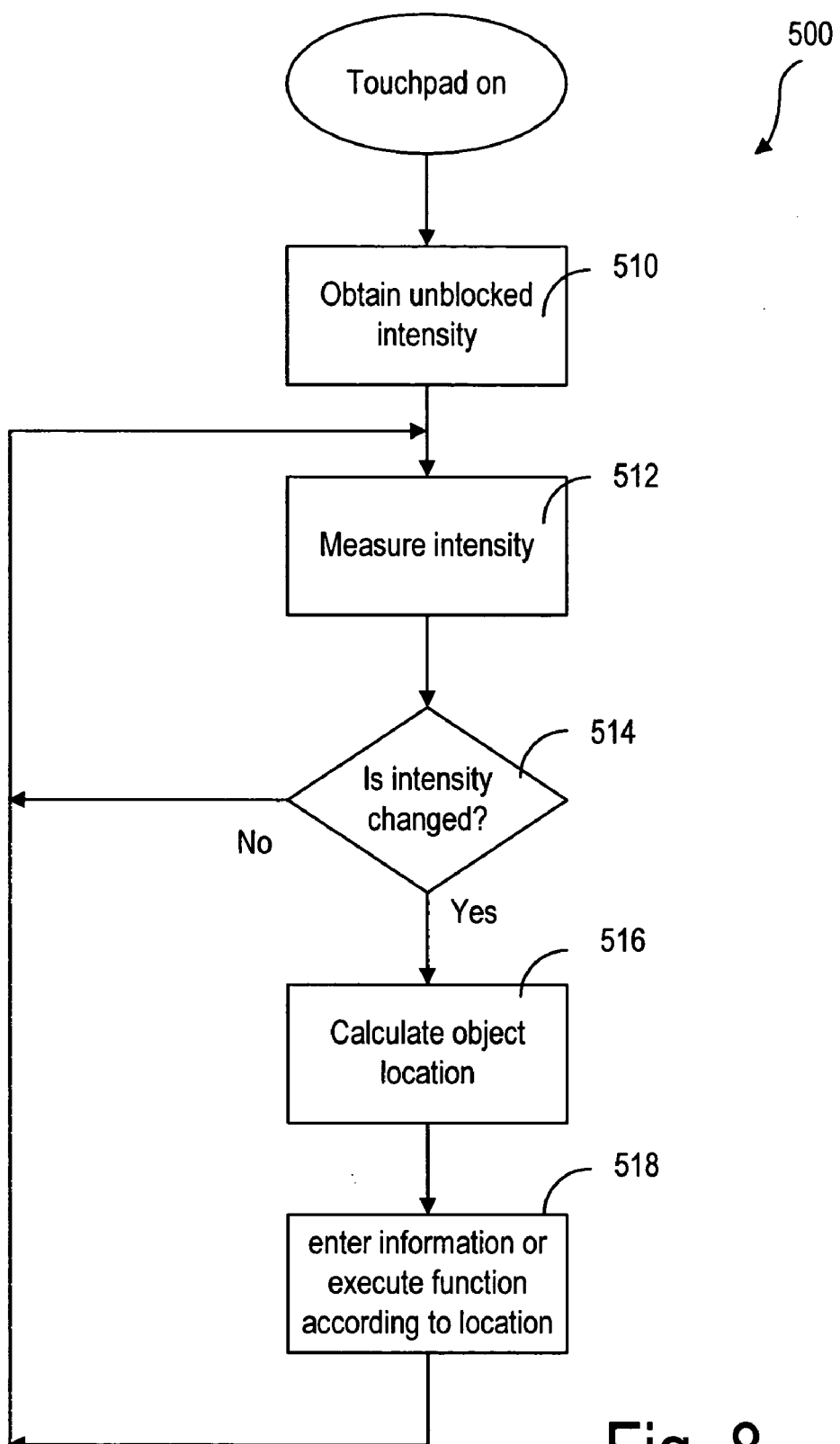
FIG. 8 is a flowchart illustrating the method of touch-pad detection, according to the present invention.

In sum, the present invention uses a light sheet formed by a plurality of substantially parallel light beams positioned on top of a touch screen to detect the motion or location of an object touching the screen. A light detecting structure, disposed at one of the edges of the touch screen, is used to measure the intensity of the light beams. When the object is touching the screen or in the close proximity to the touch screen, it blocks some of the light beams in the light sheet, casting a shadow over the light detecting structure. As such, the measured intensity is reduced. Because the light intensity distribution of the light sheet is spatially varying in such a manner that the reduction in the measured intensity is dependent upon the location of the touching object, it is possible to determine the location of the touching object based on the reduced intensity. A touch pad is usually used for input information in an electronic device, or for executing a function of the electronic device based on the location of the touching object. The method of determining the location of the touching object is illustrated in the flowchart 500 shown in FIG. 8. After the light sheet and the light detecting structure are turned on, the unblocked intensity of the light sheet as measured by the light detecting structure is obtained at step 510. At a regular interval, the light intensity is measured by the light detecting structure at step 512. If the measured intensity, as determined at step 514, is the same as a previous measurement, indicating that the touch pad is not touched. The process loops back to step 512. If the measured intensity is changed—a reduction from the unblocked intensity, this indicates that the touch pad is touched by an object—then the object location is calculated at step 516 based on the reduction in the measured intensity. At step 518, a function is executed or information entered as determined by the touched location. The process loops back to step 512 and the intensity of the light sheet is again measured. If the intensity is not changed, the touching object remains at the same location. If the intensity is changed but the measured intensity is smaller than the unblocked intensity, this indicates that the touching object is moved to another location. The new location is calculated at step 516 and a new function is executed at step 518. If the intensity is changed and the measured intensity is substantially equal to the unblocked intensity, this indicates that the touching object is removed from the touch pad. The measurement cycle starts again at step 512.

Ideally, the light source (L, L1, L2) is a collimating beam so that the size of the reflected beams (b, b1, b2) is substantially constant throughout the light sheet. In that case, the size of the shadow cast on the light detecting structure (P, P1, P2) is the same regardless of the location of the touching object. In practice, the incoming beam B may be slightly diverging. In that case, the shadow is bigger when the touching object is located nearer to reflection bar (R, R1, R2), resulting in a greater reduction in the measured intensity. For example, if two light emitter/detector systems are used to determine the x coordinate of touching object 20 as shown in FIG. 3, the shadow seen by P1 than the shadow seen by P2. This effect will affect the measurement precision in the x direction. However, if two more light emitter/detector systems are used to determine the y coordinate of the same object, it is possible to adjust the x location based on the y coordinate of the touching object and vise versa.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method for determining a location of an object substantially touching a touch pad, the touch pad having a plurality of surrounding edges, said method comprising:

providing a light sheet comprising a plurality of light beams oriented to propagate in an air space over the touch pad such that the light sheet is partially blocked by the object when the object intrudes into the air space, wherein light intensity of the light sheet is spatially varying in such a manner that the light intensity of the partially blocked light sheet is dependent upon the location of the touching object, and wherein the light beams are provided by a first light providing structure disposed adjacent to a first surrounding edge and a second light providing structure disposed adjacent to a second surrounding edge opposite to the first surrounding edge, and wherein each of the first and second light providing structures has a longitudinal axis and further comprises a light source for providing a source beam along the longitudinal axis, and a plurality of partially reflecting surfaces distributed along the longitudinal axis to partially reflect the source beam for providing the light beams in the light sheet such that light intensity of the light beams varies along the longitudinal axis;

disposing a first light detecting structure behind the second light providing structure for measuring the light intensity of the light beams provided by the first light providing structure, wherein the measured light intensity is reduced when the light sheet is partially blocked by the object;

disposing a second light detecting structure behind the first light providing structure for further measuring the light intensity of the light beams provided by the second light providing structure, wherein the further measured light intensity is reduced when the light sheet is partially blocked by the object; and calculating the location of the object based on the measured reduced intensity and the further measured reduced intensity.

2. The method of claim 1, wherein each of the first and second light providing structures comprises a plurality of substantially parallel plates having a plurality of interfaces between adjacent parallel plates to provide said partially reflecting surfaces.

3. The method of claim 1, wherein the light source comprises a laser.

4. The method of claim 1, wherein the light beam is a substantially collimated light beam.

5. The method of claim 1, wherein said surrounding edges further comprise a third surrounding edge and an opposing fourth surrounding edge, said method further comprising:

providing a third light providing structure adjacent to the third surrounding edge and a fourth light providing structure for providing a further light sheet in the air space over the touch pad such that the further light sheet is partially blocked by the object when the object intrudes into the air space, wherein light intensity of the further light sheet is spatially varying in such a manner that the light intensity of the partially blocked further light sheet is dependent upon the location of the object;

disposing a third light detecting structure behind the fourth light providing structure for measuring light intensity of part of the further light sheet provided by the third light providing structure;

disposing a fourth light detecting structure behind the third light providing structure for measuring the light intensity of part of the further light sheet provided by the fourth light providing structure, and calculating the location of the touching object also based on the measured light intensity of the further light sheet provided by the third and fourth light providing structures.

6. A light detecting system for use in conjunction with a touch pad for determining a location of an object substantially touching the touch pad, the touch pad having a plurality of surrounding edges, said system comprising:
  a light sheet comprising a plurality of light beams oriented to propagate in an air space over the touch pad such that the light sheet is partially blocked by the object when the object intrudes into the air space, wherein light intensity of the light sheet is spatially varying in such a manner that the blocked intensity is dependent upon the location of the object, and wherein the light beams are provided by a first light providing structure disposed adjacent to a first surrounding edge and a second light providing structure disposed adjacent to a second surrounding edge opposite to the first surrounding edge, and wherein each of the first and second light providing structures has a longitudinal axis and further comprises a light source for providing a source beam along the longitudinal axis, and a plurality of partially reflecting surfaces distributed along the longitudinal axis to partially reflect the source beam for providing the light beams in the light sheet such that light intensity of the light beams varies along the longitudinal axis;
  a first light detecting structure disposed behind the second light providing structure for measuring the light intensity of the light beams provided by the first light providing structure trough the second light providing structure for providing a signal indicative of a first measured light intensity, wherein the first measured light intensity is reduced when the light sheet is partially blocked by the object;
  a second light detecting structure disposed behind the first light providing structure for measuring the light intensity of the light beams provided by the second light providing structure through the first light providing structure for providing a further signal indicative of a second measured light intensity, wherein the second measured light Intensity is reduced when the light sheet is partially blocked by the object; and
  a computation module, responsive to the signal and the further signal, for calculating the location of the object based on the first measured reduced intensity and the second measured reduced intensity.

7. The system of claim 6, wherein each of the first and second light providing structures comprises a plurality of substantially parallel plates having a plurality of interfaces between adjacent parallel plates to provide said partially reflecting surfaces.

8. The system of claim 7, wherein an air gap is provided between two adjacent parallel plates.

9. The system of claim 7, wherein a substantially transparent bonding material is provided between two adjacent parallel plates.

10. The system of claim 7, wherein the plurality of substantially parallel plates comprise plates made of materials of different refractive indices.

11. The system of claim 7, wherein at least a partial reflective coating is provided at each of the interfaces.

12. The system of claim 6, wherein the light source comprises a laser.

13. The system of claim 6, wherein the light beam is substantially collimated.

14. The system of claim 6, wherein the light source emits light in the visible wavelength region.

15. The system of claim 6, wherein the light source emits light in the infrared wavelength region.

16. The system of claim 6, wherein said surrounding edges further comprise a third surrounding edge and an opposing fourth surrounding edge, said system further comprising:
  a third light providing structure disposed adjacent to the third surrounding edge and a fourth light providing structure disposed adjacent to the fourth surrounding edge for providing a further light sheet in the air space over the touch pad such that the further light sheet is partially blocked by the object when the object intrudes into the air space, wherein light intensity of the further light sheet is spatially varying in such a manner that the light intensity of the partially blocked further light sheet is dependent upon the location of the object;
  a third light detecting structure disposed behind the fourth light providing structure for measuring light intensity of part of the further light sheet provided by the third light providing structure for providing to the computation module a third signal indicative of a third measured light intensity, wherein the third measured light intensity is reduced when the further light sheet is partially blocked the object; and
  a fourth light detecting structure disposed behind the third light providing structure for measuring the light intensity of further part of the further light sheet provided by the fourth light providing structure for providing to the computation module a fourth signal indicative of a fourth measured light intensity of the further light sheet, wherein the fourth measured light intensity of the further light sheet is reduced when the light sheet is partially blocked by the touching object, so as to allow the computation module to calculate the location of the object also based on the third and fourth measured reduced light intensity of the further light.

17. The system of claim 8, wherein each of the first and second light detecting structures comprises:
  a light detector for providing the signal; and
  a light pipe for receiving at least a part of the light sheet and conveying at least a part of the received light to the light detector.

18. The system of claim 17, wherein the light pipe has a first end, an opposing second end, a longitudinal axis connecting the first end and the second end, and a pipe surface along the longitudinal axis, wherein the light detector is disposed at the first end, and wherein the pipe surface has diffractive or prismatic surfaces to convey said at least a part of the received light to the first end.

19. The system of claim 18, wherein each of the first and second light detecting structures further comprises:
  a reflecting surface disposed at the second end of the light pipe for directing at least a further part of the received light toward the light detector.

20. The system of claim 19, wherein the reflecting surface is provided by a mirror disposed adjacent to the second end of the light pipe.

21. The system of claim 18, wherein each of the first and second light detecting structures comprises:
  a further light detector disposed at the second end of the light pipe, wherein the diffractive or prismatic surfaces also convey a further part of the received light to the further light detector for providing a further signal so as to allow the computation module to calculate the location of the touching object also based on the further signal.

* * * * *

UNITED STATES PATENT AND TRADEMARK OFFICE
CERTIFICATE OF CORRECTION

PATENT NO. : 7,265,748 B2
APPLICATION NO. : 10/733872
DATED : September 4, 2007
INVENTOR(S) : Ryynanen It is certified that error appears in the above-identified patent and that said Letters Patent is hereby corrected as shown below:

Column 8, line 54, claim 5, line 7, "tat" should be --that--.

Column 9, line 41, claim 6, line 39, "Intensity", should be --intensity--.

Column 10, line 36, claim 17, line 1, "claim 8" should be --claim 6--.

Signed and Sealed this

Twenty-fifth Day of March, 2008

JON W. DUDAS
*Director of the United States Patent and Trademark Office*